(12) United States Patent
Reiter et al.

(10) Patent No.: US 10,724,621 B2
(45) Date of Patent: Jul. 28, 2020

(54) CHAINRING

(71) Applicant: SRAM Deutschland GmbH, Schweinfurt (DE)

(72) Inventors: Markus Reiter, Schweinfurt (DE); Joachim Hanke, Niederwerrn (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 421 days.

(21) Appl. No.: 15/622,608

(22) Filed: Jun. 14, 2017

(65) Prior Publication Data

US 2017/0276229 A1    Sep. 28, 2017

Related U.S. Application Data

(62) Division of application No. 14/297,261, filed on Jun. 5, 2014, now Pat. No. 9,719,590.

(30) Foreign Application Priority Data

Jun. 5, 2013  (DE) .......................... 10 2013 009 492

(51) Int. Cl.
  *F16H 55/30*  (2006.01)
  *B62M 9/10*  (2006.01)

(52) U.S. Cl.
  CPC ............... *F16H 55/30* (2013.01); *B62M 9/10* (2013.01)

(58) Field of Classification Search
  CPC .................................... F16H 55/30; B62M 9/10
  See application file for complete search history.

(56) References Cited

U.S. PATENT DOCUMENTS

| | | | |
|---|---|---|---|
| 3,654,814 A | 4/1972 | Richmond | |
| 3,745,851 A | 7/1973 | Zeldman et al. | |
| 4,867,733 A | 9/1989 | Yamanoi et al. | |
| 6,325,734 B1* | 12/2001 | Young | F16H 7/06 474/156 |
| 6,500,084 B2* | 12/2002 | Wigsten | F16G 13/04 474/152 |
| 7,097,580 B2 | 8/2006 | Sakamoto | |
| 9,328,814 B2* | 5/2016 | Wesling | F16H 55/06 |
| 9,581,230 B2* | 2/2017 | Pfeiffer | F16H 7/06 |

(Continued)

FOREIGN PATENT DOCUMENTS

| | | |
|---|---|---|
| CN | 1646831 A | 7/2005 |
| DE | 2816137 A1 | 10/1979 |

(Continued)

*Primary Examiner* — Michael R Mansen
*Assistant Examiner* — Robert T Reese

(57) ABSTRACT

Solitary chainring for a bicycle front crank and drive chain, including a plurality of teeth formed thereabout. The plurality of teeth includes a first group of teeth and a second group of teeth alternating with the first group of teeth. Each tooth includes an outer face and an inner face which is opposite the outer face, and each tooth of the first group of teeth includes at least one first protrusion on the outer face or the inner face, and each tooth of the second group of teeth is formed without a first protrusion. The first protrusion is formed by a material deformation on one face of the teeth of the first group of teeth, wherein the material deformation is achieved from the inner face or the outer face, or it is formed by an application of material on one face of the teeth of the first group of teeth.

14 Claims, 17 Drawing Sheets

(56) References Cited

U.S. PATENT DOCUMENTS

| | | | |
|---|---|---|---|
| 9,581,231 B2* | 2/2017 | Pfeiffer | F16H 55/30 |
| 9,625,027 B2* | 4/2017 | Pfeiffer | F16H 55/30 |
| 2002/0169044 A1 | 11/2002 | Young | |
| 2004/0116224 A1* | 6/2004 | Sakamoto | F16H 55/30 |
| | | | 474/152 |
| 2007/0054768 A1* | 3/2007 | Miyazawa | F16H 55/30 |
| | | | 474/152 |
| 2013/0139642 A1* | 6/2013 | Reiter | B62M 9/105 |
| | | | 74/594.2 |
| 2013/0184110 A1* | 7/2013 | Reiter | F16H 55/303 |
| | | | 474/152 |
| 2015/0285363 A1* | 10/2015 | Pfeiffer | F16H 55/30 |
| | | | 474/152 |
| 2015/0285364 A1* | 10/2015 | Pfeiffer | F16H 55/30 |
| | | | 474/152 |

FOREIGN PATENT DOCUMENTS

| | | |
|---|---|---|
| DE | 202012012533 U1 | 3/2013 |
| EP | 0934871 B1 | 3/2006 |
| EP | 1764296 A1 | 3/2007 |
| FR | 2545902 A1 | 11/1984 |
| JP | 200771302 A | 9/2007 |
| WO | 9806962 A1 | 2/1998 |

* cited by examiner

CHAINRING

This application is a divisional application of U.S. patent application Ser. No. 14/297,261, filed Jun. 5, 2014, which claims priority to, and/or the benefit of, German patent application DE 10 2013 009 492.5, filed on Jun. 5, 2013, all of which are hereby incorporated by reference in their entirety.

BACKGROUND OF THE INVENTION

The present invention relates to chainrings, and in particular, one embodiment contemplates solitary chainrings for use with a known chain in a bicycle drivetrain system which comprises a bicycle crank.

Bicycles and other chain-driven vehicles generally use one or more chainrings mounted to a crank arm and a set of sprockets which are mounted on a rear hub and are connected to the chainring via a chain. Various mechanisms are used for holding the chain on the chainring and the sprocket in use. These mechanisms comprise chain guards, chain tensioners, chain watchers, rear derailleur arrangements and the like.

When riding a bicycle with a chain-driven drive train, the handling of the chain and the chainring engagement is particularly important for a safe and effective drive of the bicycle. Keeping the chain in engagement with the chainring may be difficult. In particular, in bicycles with gear-shifting devices, considerable changes in the chain tension and dynamic movements of the chain can occur, above all when riding off-road.

Furthermore, in each bicycle the chainring may touch the chain stay of the bicycle frame if the crank is in a position in which high loads are exerted by the rider, which causes an elastic deformation of the bicycle frame and the crank arrangement. This can lead to damage to the frame and to the chainring and can cause other problems.

From the prior art a plurality of chainrings, but also sprockets, is known, wherein the teeth are deformed locally in order to facilitate upshifts or in order to improve the chain guiding characteristics.

Reference is made for example to the document WO 98/06962 A1, in which the teeth are in zigzag form or offset in an undulating form along the circumferential direction in order to avoid rattling of the chain. A similar solution is known from the document FR 2 545 902 A1 and from the document DE 28 16 137 A.

The document EP 0 934 871 B1 shows a sprocket arrangement in which individual sprockets have been machined to remove material in order to avoid build-up of dirt and to facilitate upshifts for the chain during gear-shifting operations.

The document U.S. Pat. No. 3,745,851 shows a chain wheel in which the teeth are broadened by deformations in the region of the tooth flanks.

The document U.S. Pat. No. 3,654,814 shows a solution in which oval bead-like protrusions are provided on both sides of the teeth.

Finally the document U.S. Pat. No. 4,867,733 shows a chain wheel in sandwich construction which is produced in its central region from an elastic body which is in each case surrounded laterally by metal plates forming the individual teeth. Additionally, if need be lateral buffer elements are provided.

On the one hand the prior art described above has disadvantages, in particular because the manufacture is complex and therefore expensive, and moreover is subject to the problem that the required chain guiding characteristics cannot be reliably and permanently set.

The object of the invention is to provide a chainring which enables improved handling of the drive chain, in particular for bicycles which are ridden successfully and reliably on rough and demanding ground, wherein the production of the chainring according to the invention takes place simply and cost-effectively with high functionality and long service life of the chainring.

BRIEF SUMMARY OF THE INVENTION

This object is achieved according to the invention by a chainring with the features set out in the claims. Advantageous embodiments of the invention are set out in the dependent claims and in the following description.

According to one embodiment, the present invention provides a solitary chainring for a bicycle front crank arrangement for engaging in a drive chain. The solitary chainring, wherein "solitary" means only a single one, and preferably a chainring without features that enable or promote shifting on and off of the chainring, comprises a plurality of teeth formed around the circumference of the chainring, wherein the plurality of teeth has an even number of teeth. The plurality of teeth comprises a first group of teeth and a second group of teeth which may alternate with the first group of teeth. The number of the first group of teeth and of the second group of teeth may be the same. Each first and second group of teeth comprises an outer face and an inner face which is opposite the outer face. Each tooth of the first group of teeth comprises at least one first protrusion on one of the outer face and inner face, and each tooth of the second group of teeth is formed without a protrusion. According to the invention it is also provided that the first protrusion may be formed by a material deformation on one of the tooth faces, which is achieved starting from the inner face or from the outer face. Alternatively, according to the invention, it is provided that the first protrusion is formed by an application of material on one face.

In the first alternative according to the invention, the chainring is simply processed by local material transformation in such a way that the required protrusions are formed on the first group of teeth. Comprehensive shaping operations, which take place for instance over the entire circumference of the chainring, are not necessary. As a result the basic structure of the chainring can be retained and this can only be affected by shaping where interventions are also actually necessary for achieving improved chain guiding characteristics, namely on the teeth of the first group of teeth.

The same principle applies to the second alternative according to the invention, in which application of material takes place locally, for example by injection moulding or over-moulding, build-up welding or application of soldering material, in order to configure the teeth of the first group of teeth to be wider in the regions co-operating with the chain. Also, in this alternative according to the invention, the chainring only has to be processed locally by application of material.

Both alternatives according to the invention offer the advantage of relatively low processing costs resulting in significantly improved chain guiding characteristics by comparison with the prior art.

The invention may also provide a solitary chainring of the type described above for a bicycle front crank arrangement for engagement in a drive chain, wherein the drive chain comprises overlapping inner and outer link elements, wherein the chainring has a plurality of teeth formed around a circumference of the chainring, and the plurality of teeth may have an even number of teeth. The plurality of teeth comprises a first group of teeth and a second group of teeth which may alternate with the first group of teeth. The first group of teeth and the second group of teeth may be the same in terms of number. Each tooth of the first and second group of teeth comprises an outer face and an inner face which is opposed to the outer face. Each outer face and each inner face of every of the second group of teeth defines a link-receiving recess formed in the chainring along the second group of teeth.

The invention further relates to a bicycle crank arrangement which comprises a bicycle crank arm and a solitary chainring of the type described above, which is mounted on the bicycle crank arm and can be brought into engagement with a drive chain. The solitary chainring comprises a plurality of teeth formed around a circumference of the chainring, wherein the plurality of teeth may have an even number of teeth. The plurality of teeth comprises a first group of teeth and a second group of teeth which may alternate with the first group of teeth. The first group of teeth and the second group of teeth may be the same in terms of number. Each tooth of the first and second group of teeth comprises an outer face and an inner face which is opposite the outer face. Each tooth of the first group of teeth comprises at least one first protrusion on one of the outer and inner face, and each tooth of the second group of teeth is formed without a first protrusion on the outer face and the inner face.

According to one embodiment, the chainring described above may have a second protrusion on the other face of the first group of teeth. To this end the second protrusion is formed by a material deformation which is produced starting from the inner face or from the outer face or by an application of material on one of the inner and outer face.

According to an embodiment of the present invention it may also be provided that in the chainring of the type described above the first protrusion has a first width and the second protrusion has a second width, wherein the first width is the same as the second width. Alternatively, according to a modification of the invention, the first width may be greater than the second width or vice versa.

With regard to the first alternative according to the invention it may be provided that the first or/and the second protrusion is produced by deformation or creating an impression, wherein material of the tooth is impressed from one side and formation of the protrusion on the other side of the tooth is formed by "pressing out" of the tooth in the required shape. This takes place, for instance, by application of a shaping tool on one side of the tooth and local deformation of the tooth, so that a recess, impression or depression is produced on the tooth. As a result material flows in the required manner onto the other side of the tooth in order to create the protrusion.

A modification of the invention provides that the second protrusion is provided by material transformation radially above the impression for the first protrusion.

As an alternative to the manufacturing possibility described above of the impression and "pressing through" of tooth material from one side of a tooth to the other, a modification of the invention provides that the first or/and the second protrusion is produced by impression, wherein material of the tooth is impressed locally on one side of the tooth, so that to produce formation of the at least one protrusion, material is caused to protrude on the same side of the tooth close to the local impression. Thus, in this variant of the invention, the material is not, so to speak, pressed through the tooth but locally deformed, so that it protrudes at the side of the deformation on the same side of the tooth in order to form the protrusion.

A modification of this variant of the invention provides that, for formation of two protrusions on one and the same side of the tooth, material protrudes on both sides of the local impression. In other words, the tooth is deformed locally by impression in such a way that during reshaping the material is displaced into a region on both sides of the impression and bulges there to form the two protrusions on the same side of the tooth. In this case it is possible for two substantially linear bumps, projections or protrusions to be produced along the impression if the latter is of elongate form. A modification of the invention provides that the protruding material forming at least one protrusion extends at least in some sections around the local impression. Thus, more complex protrusion structures can also be achieved.

With regard to the dimensions, in the deepest region of the impression or one of the opposing impressions on the outer face and the inner face of the respective tooth, the thickness of the tooth can be reduced to up to 30% of its original thickness. In the region of the at least one protrusion the thickness of the tooth can be increased by 30-50%.

The impression may be limited to a local region or may be produced in a radial length which extends over 30% to 100% of the radial height of the tooth. The protrusions are preferably of rounded form and sharp edges are avoided. The same applies to the configuration of the impressions.

With regard to the aforementioned second alternative according to the invention for the application of material it may be provided that the application of material consists of metal or a plastic material or a synthetic resin material, preferably a fibre-reinforced plastic material or a fibre-reinforced synthetic resin material. Thus, the application of material can be achieved by build-up welding, build-up brazing or by local application of the plastic material or synthetic resin material.

For fixing of the applied material, the tooth can be roughened locally. Preferably, however, according to the invention the tooth is provided in the region of the application of material with at least one recess or/and at least one opening in to which the applied material extends at least in some sections. As a result the applied material can be anchored better on the tooth or even in the tooth.

A modification of the invention provides that each outer face and each inner face of every second group of teeth defines a recess formed in the chainring along each second group of teeth.

In the chainring described above it may also be provided according to a modification of the invention that each tooth of the first group of teeth and of the second group of teeth comprises a front flank, wherein the front flank comprises a projecting tip section which is constructed for guiding the chain.

In the chainring described above it may also be provided according to an embodiment of the invention that each tooth of the first group of teeth and of the second group of teeth comprises a rear flank, wherein the rear flank comprises a hook section which is constructed for guiding the chain.

In the chainring of the type described above it may also be provided according to a modification of the invention that each tooth of the first group of teeth and of the second group of teeth comprises a front flank and a rear flank, wherein the front flank of each tooth comprises a projecting tip section.

In the chainring described above it may also be provided according to a modification of the invention that the rear flank of each tooth comprises a hook section.

In the chainring described above, according to an embodiment of the invention the hook section can comprise a substantially radially oriented section.

In the chainring described above it may also be provided according to a modification of the invention that the projecting tip section and a hook section of an adjacent tooth co-operate for guiding the chain.

In the chainring of the type described above it may also be provided according to a modification of the invention that each tooth of the first group of teeth comprises a radially outer chamfer which has a first extent along the outer face of each tooth.

In the chainring of the type described above it may also be provided according to a modification of the invention that each tooth of the second group of teeth comprises a radially outer chamfer which has a second extent along the outer face of each tooth.

In the chainring of the type described above it may also be provided according to a modification of the invention that each tooth of the first group of teeth comprises an outer chamfer with a first extent, and each tooth of the second group of teeth comprises an outer chamfer which has a second extent, and the first extent is smaller than the second extent.

In the chainring of the type described above it may also be provided according to a modification of the invention that each of the inner faces and the outer faces of each second group of teeth defines a recess formed in the chainring.

In the chainring described above it may also be provided according to a modification of the invention that each recess is defined by an axially extending base surface and radially extending wall.

The invention further relates to a solitary chainring for a bicycle front crank arrangement for engagement in a drive chain, wherein the drive chain comprises overlapping inner and outer link elements, wherein the chainring is formed in the manner described above.

The present invention further relates to a bicycle crank arrangement, comprising: a bicycle crank arm; and a solitary chainring of the type described above, which is mounted on the bicycle crank arm and can be brought into engagement with a drive chain.

These and other features and advantages of the present invention will be more fully understood from the following description of one or more embodiments of the invention, taken together with the accompanying drawings.

DETAILED DESCRIPTION OF THE INVENTION

Embodiments of the invention are described below with reference to the drawings. FIGS. 1 to 16 serve first of all for explanation of the background of the invention. The actual embodiments of the invention are described with reference to FIGS. 17 to 27. It will be generally understood that the figures and the following description are intended to serve only for illustration and do not limit the invention defined in the appended claims and all its equivalents. For example the terms "first" and "second" or "left" and "right" are used only for the purpose of clarity and not as limiting terms.

Figure 1:
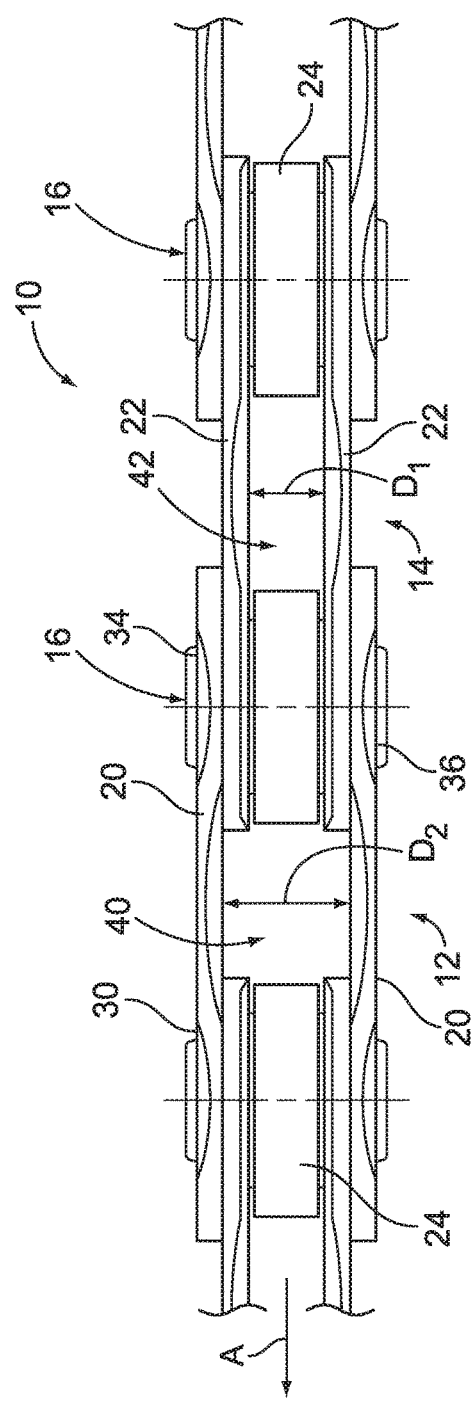
FIG. 1 is a plan view of a conventional drive chain.
Figure 2:
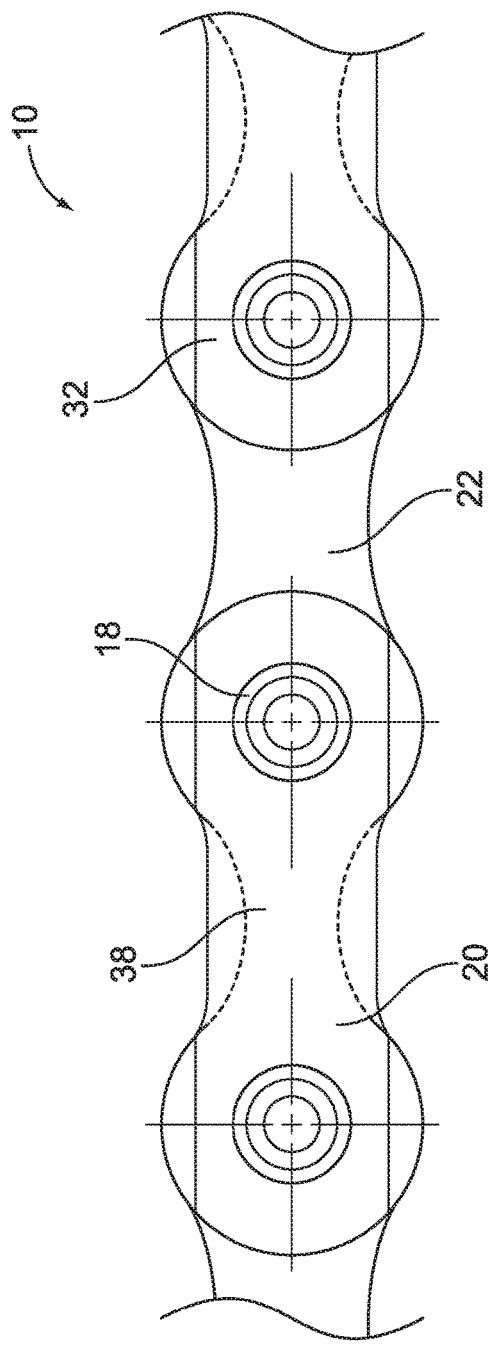
FIG. 2 is a side view of the conventional drive chain according to FIG. 1.

With reference to FIGS. 1 and 2, the reference numeral 10 essentially identifies a conventional roller drive chain for a bicycle or a similar chain-driven device. The drive chain 10 essentially comprises outer chain connecting or link elements 12 and inner chain link elements 14, which are pivotally mounted by means of pins 16, 18 on the outer chain connecting elements and connected thereto. The outer chain link elements 12 are disposed alternating and overlapping with the inner chain link elements 14.

The outer chain link elements 12 comprise in pairs outer link plates 20 and the inner chain link elements comprise in pairs inner link plates 22. Typically rollers 24 are disposed around the pins 16, 18. The plates 20, 22 are provided with openings 30 on their ends 32. The pins 16 and 18 extend through and project out of the openings 30, although non-projecting pins are generally regarded as optimal. The pins 16 and 18 are riveted on their ends 34, 36 during the assembly of the roller chain 10. Whilst the pin 16 is produced from a cylindrical bar, the pin 18 can also be produced from a tubular bar, as in the roller chain 10 shown in FIG. 2. A smaller middle section 38 which assists the fixing of the position of the roller chain 10 extends between the two circular ends 32 of each of the outer link plates 20 and the inner link plates 22.

As can be seen most clearly in FIG. 1, when viewed from the top (or bottom) of the chain the overlapping outer link elements 12 and inner link elements 14 form corresponding and alternating outer link spaces 40 and inner link spaces 42. The outer link spaces 40 are openings which are defined by the outer link plates 20 and the rollers 24. The inner link spaces 42 are openings which are defined by the inner link plates 22 and the rollers 24.

The inner link spaces 42 are of substantially rectangular construction, wherein the longitudinal axis of the rectangle coincides with the longitudinal axis A of the chain 10 (in the sight line according to FIG. 1). The axial length of the inner connecting spaces 40 is defined by the distance between the rollers 24, whereas the distance between the inner link plates 22 determines the transverse extent of the inner link spaces.

As is illustrated in FIG. 1, the outer link spaces 40 have substantially the shape of a "cross" or, in other words, a "plus". The axial length of the outer link spaces 40 is defined by the distance between the rollers 24, whereas the distance between the outer link plates 20 determines the transverse extent of the outer link spaces.

As can be seen, the transverse spacing between the outer link plates 20 is greater than the distance between the inner link plates 22. Since the transverse extent of the rollers 24 determines the distance between the inner plates 22, the rollers define the transverse spacing D1 between the inner link plates 42. Since in a similar manner the outer plates 20 are positioned on the pins 16 (or 18) on the outer faces of the inner link plates 22, the transverse spacing D2 between the outer link plates 40 is defined by the sum of the transverse extent of the rollers 24 and the thickness of the two inner link plates.

Figure 3:
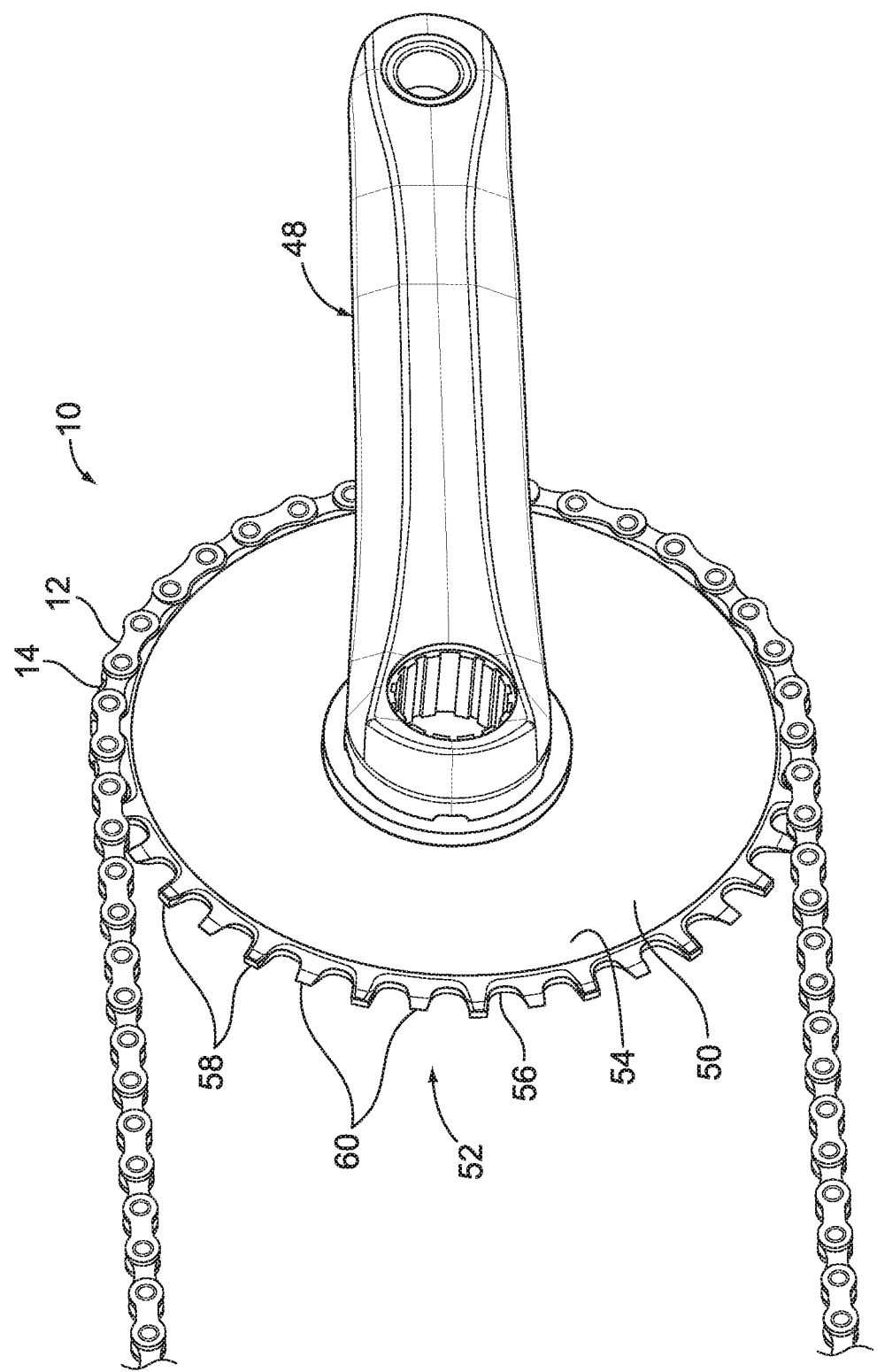
FIG. 3 is an isometric view of a combination of the drive chain and of a chainring for introductory explanation of the invention, which are in engagement with one another in a drive train.

In FIG. 3, a chainring or chain wheel 50, which is shown for explanation of the background to the invention, is used with a known chain 10. Chainrings typically have a large number of teeth, compared with sprocket cassettes, for example 20 or more teeth. A crank or a crank arm 48 is mounted in a known manner at a typical position and on the chainring 50. The crank side of the chainring 50 is shown in FIG. 3, wherein the crank side is the outer face 54 of the chainring. The outer face points away from the vehicle on which the chainring is mounted. The opposite side of the outer face 54 of the chainring 50 is the inner face 56. The inner face 56 points in the direction of the vehicle.

In general, the force exerted on the crank arm 48 (for example in a downward direction) causes a rotation of the chainring in one direction (in a clockwise direction). The rotation of the chainring 50 generates a pull on the chain 10, which is moved in this way via the chainring.

The chainring 50 has a plurality of teeth 52 which are formed around the circumference 51 of the chainring. The total number of the plurality of teeth is an even number. The plurality of teeth 52 comprises a first group of teeth 58 and a second group of teeth 60 which are disposed in an alternating manner. The number of first groups of teeth and of second groups of teeth is the same. With this chainring, however, also in the invention the first group of teeth 58 is constructed to be received by and fitted into the outer link spaces 40, and a second group of teeth 60 is provided which is constructed to be received by and for fitted into the inner link spaces 42.

The shape of the chainring circumference 51 may be substantially circular or not circular, i.e., for example elliptical, oval, polygonal or parabolic. All examples of a chainring are shown here with a circular circumference 51.

Each tooth of the first group of teeth is constructed for engagement with the chain 10 via the outer link spaces 40. Each tooth of the second group of teeth is constructed for engagement with the chain 10 via the inner link spaces 42.

Figure 12:
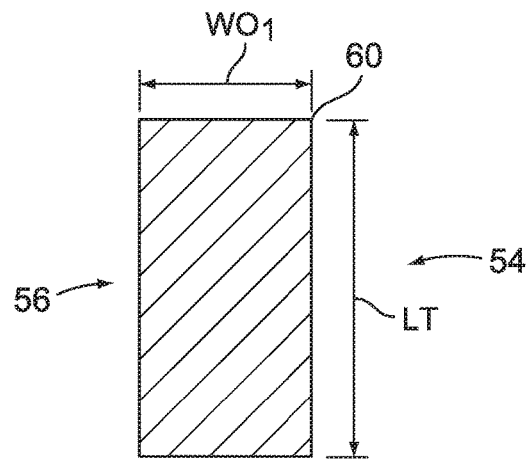
FIG. 12 is a cross-sectional view along the section line B-B according to FIG. 5 of a type of gear tooth according to one group of teeth.

Referring now to FIG. 12, each tooth of the second group of teeth 60 has a shape of which the cross-sectional view is substantially rectangular, in particular on or near the base or the root of the teeth. The cross-sectional view is produced by a section along a plane which runs parallel to the upper face 80 of the teeth and extends through a base circular position of the teeth, that is to say around half of the path between the root circle and the outer face circle.

The rectangular cross-section and the overall width $WO_1$ of each tooth of the second group of teeth 60 should be closely co-ordinated with the form of each of the inner link spaces 42 (FIG. 1). The illustrated cross-section of each tooth of the second group of teeth shows the outer face 54 as substantially planar and the inner face 56 also as substantially planar. Every tooth of the second group of teeth 60 may fill over approximately 75% of the axial spacing $D_1$ of a corresponding space in the chain 10. Preferably each tooth of the second group of teeth 60 may fill over approximately 80% of $D_1$ of the corresponding space in the chain 10. Preferably each tooth of the second group of teeth 60 may fill over approximately 85% of $D_1$ of the corresponding space in the chain 10.

Figure 13:
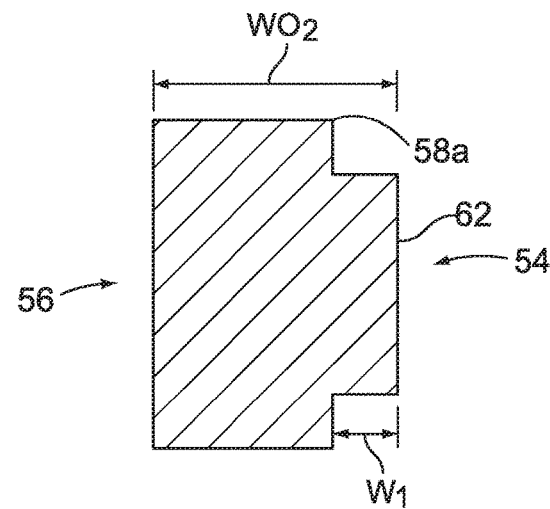
FIGS. 13-15 are cross-sectional views, along the section line A-A according to FIG. 5, of alternative variants of a gear tooth which differ from the tooth according to FIG. 12 and are formed according to another group of teeth.
Figure 14:
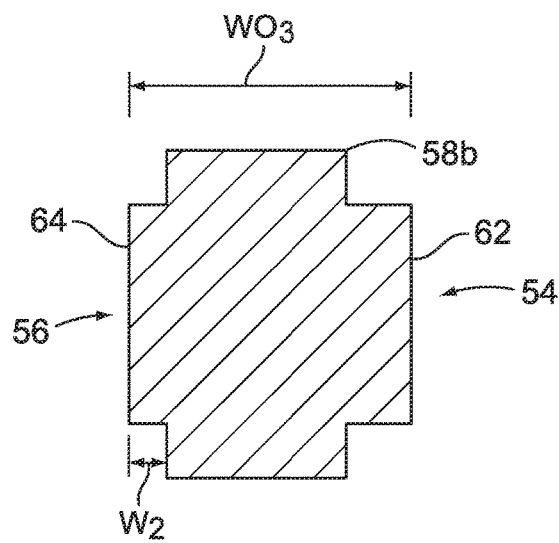
Figure 15:
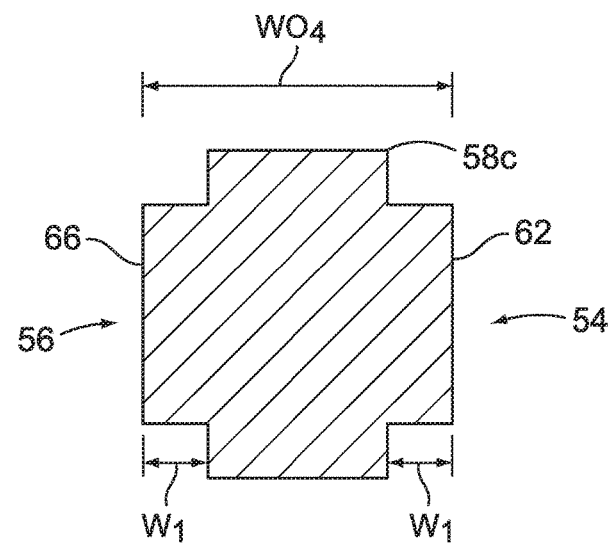

Referring to FIGS. 13-15, each of the alternative variants of the teeth 58a, 58b, 58c of the first group of teeth 58 (see FIG. 3) has a shape which in a cross-sectional view through the tooth, as shown in FIG. 12, has the same length $L_T$ in the longitudinal direction than the second group 60 (FIG. 12). Each tooth of the second group of teeth 58 may fill over approximately 75% of the distance $D_2$ of a corresponding space in the chain 10. Preferably each tooth of the first group of teeth 58 fills over approximately 80% of $D_2$ of the corresponding space in the chain 10. Most preferably each tooth of the first group of teeth 58 fills over approximately 85% of $D_2$ of the corresponding space in the chain 10.

Each tooth of the first group of teeth 58 has an additional feature on the outer face or a first protrusion 62 on the outer face 54 on each alternate tooth 58a, 58b and 58c. As also shown in FIG. 13, the inner face 56 of the tooth 58a can be the same (that is to say without a protrusion) as the inner face 56 of each of the second groups of teeth 60. The first protrusion 62 is in constructed in such a way that it fits into a corresponding part of the outer link spaces 40 of the chain 10 (FIG. 1) fits and has a width $W_1$. The protrusion 62 contributes to holding the chain 10 on the chainring 50 (FIG. 3). The protrusion 62 ensures that the overall width $WO_2$ of each tooth 58a is greater than the overall width $WO_1$ by the extent of the protrusion 62.

FIG. 14 shows another embodiment of a tooth 58b of the first group of teeth 58. In particular the tooth 58b is of similar construction to the teeth shown in FIG. 13, with the additional feature of an inner or second protrusion 64 on the inner face 56 of the teeth. The protrusion 64 has a width $W_2$ which is less than the width $W_1$ of the protrusion 62 of the tooth 58a, or alternatively greater than $W_1$. The protrusions 62, 64 ensure that the overall width $WO_3$ of each tooth 58b is greater than the overall width $WO_1$ of each tooth 60 by the extent of the protrusions 62, 64. Furthermore $WO_3$ is greater than $WO_2$.

FIG. 15 shows another embodiment of a tooth 58c of the first group of teeth 58. In particular the tooth 58c is of similar construction to the tooth shown in FIG. 14, with an inner or second protrusion 66 on the inner face 56 of the tooth. The protrusion 66 has a width $W_1$ which is equal to the width $W_1$ of the protrusion 62 of the tooth 58a. The protrusions 62, 66 ensure that an overall width $WO_4$ of each tooth 58c is greater than the overall width $WO_1$ of each tooth 60 by the extent of the protrusions 62, 66. Furthermore $WO_4$ is greater than $WO_3$.

It can be seen that different embodiments of the teeth 58 comprise protrusions which are provided along the side or the sides of each tooth in a position at which they contribute effectively to the positioning of the chain on the tooth ring 50, wherein positions are comprised which are close to or on the base of each tooth or higher on each tooth 58.

Figure 4:
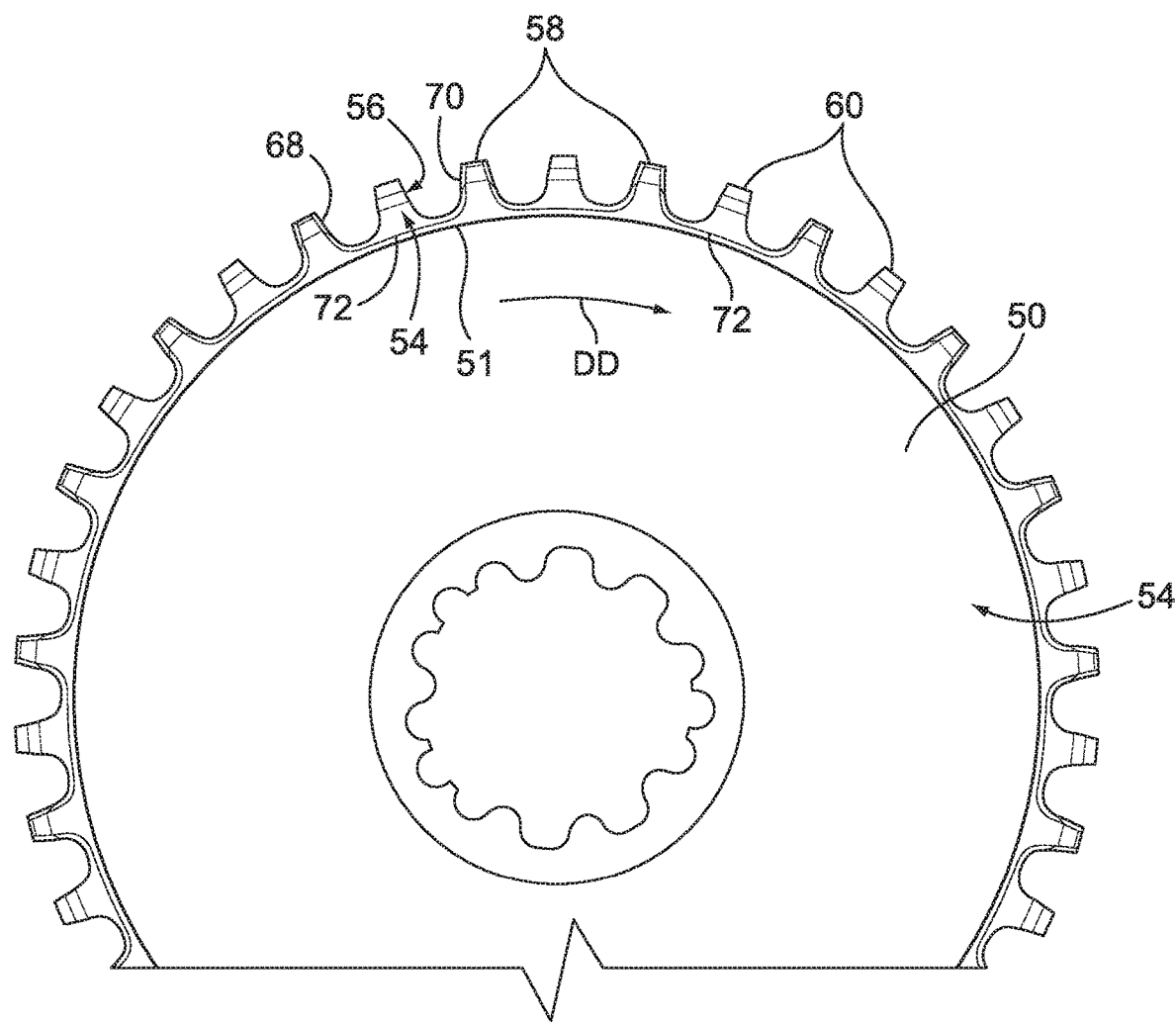
FIG. 4 is a side view of the chainring of FIG. 3.
Figure 6:
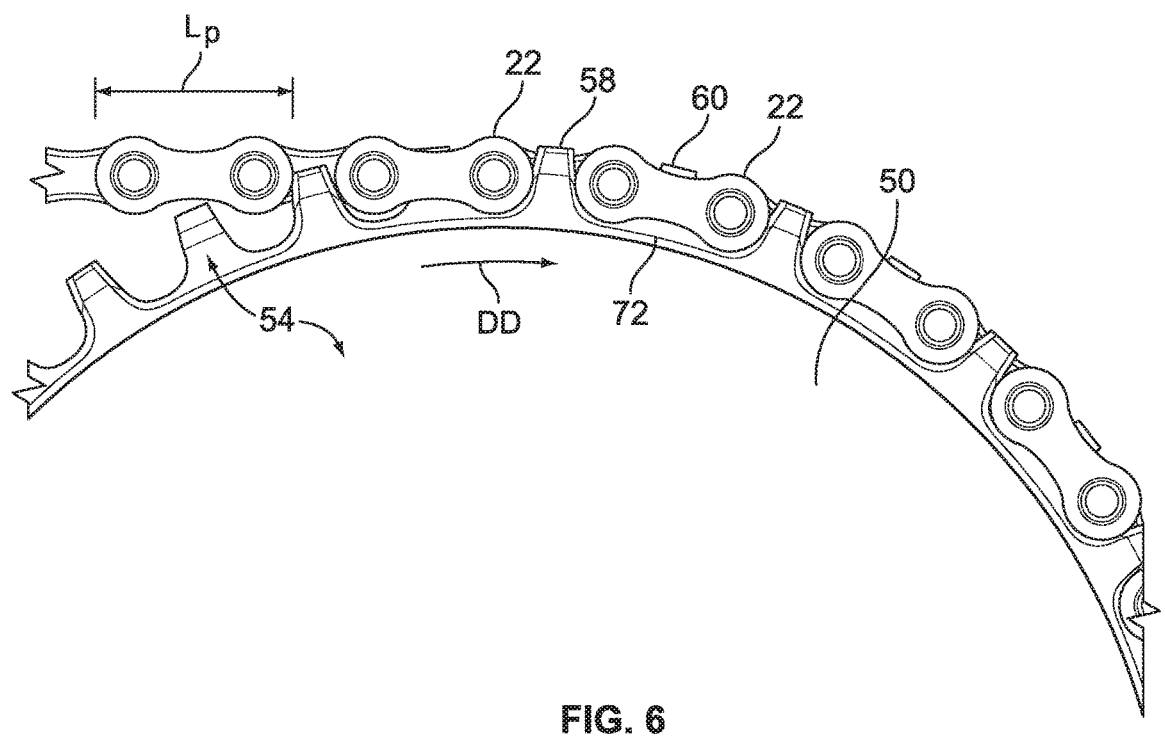
FIG. 6 is a side view a combination a drive chain and a chainring according to and for explanation of the present invention which is in engagement with a drive chain with removed outer link plates.

FIGS. 4 and 6 show an outer face 54 of the chainring 50 and the driving direction DD. The first group of teeth 58 is disposed alternating with the second group of teeth 60.

The configuration of the second group of teeth 60 may be defined with respect to the outer faces and inner faces 54, 56 of each tooth 60 by forming an inner link-receiving recess 72 in the chainring 50, which represents material removed from the sides of the teeth 60. The inner link-receiving recess 72 also serves to define the cross-sectional shape of each group of teeth 58. The inner link-receiving recess 72 defines the outer faces and inner faces 54, 56 of each tooth and extends from the front flank 68 of each of the groups of teeth 58 to a rear flank 70 of an adjacent group of teeth 58 in the driving direction DD. Each inner link-receiving recess 72 is configured to receive the length Lp of an inner link plate 22 of the chain (FIG. 6). Each recess 72 has a base surface 72a which extends in an axial direction and a wall 72b (FIG. 7) which extends radially. The base surface 72a may have a slightly curved contour and may be configured substantially in a "U" shape.

Figure 5:
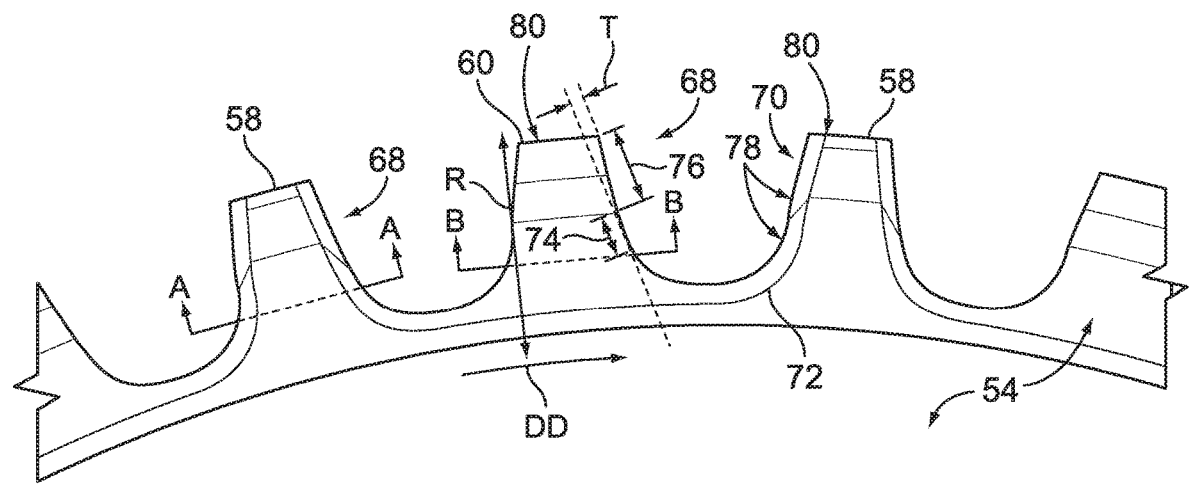
FIG. 5 is an enlarged view of the chainring according to FIG. 4.

FIG. 5 shows the profile of each tooth of the teeth 58, 60 in detail. The inner link-receiving recess 72 is formed in the chainring 50 and extends along the sides of each of the second groups of teeth 60 and from the load side of a front or leading flank 68 of one of the groups of teeth 58 to a rear flank 70 of an adjacent group of teeth 58 in the driving direction DD. The opening 72 is configured to receive the length $L_P$ (FIG. 6) of an inner connecting link plate 22. Each tooth may have an upper face 80. The base surface 72a may extend to the upper face 80 of each of the teeth 58. The front flank 68 of each tooth comprises a contact zone 74 on which a roller 24 (FIG. 1) contacts the tooth.

Above the contact zone 74 an optional tip section 76 is provided. The roller 24 does not contact the tip section 76 under normal driving conditions. The tip section 76 may protrude forwards from a line drawn along the contact zone 74 by a distance T. The protruding tip section 76 effects an earlier engagement of a chain link element than a chain without the tip section and provides better guiding of the chain.

An optional hook feature 78 is a feature which may be formed on the rear flank 70 of each tooth 58, 60. The hook feature 78 is positioned along the rear flank 70 and can co-operate with the tip section 76 for better guiding of the chain. The hook feature 78 may comprise a portion of the rear flank 70 which coincides with the radial direction R.

Figure 7:
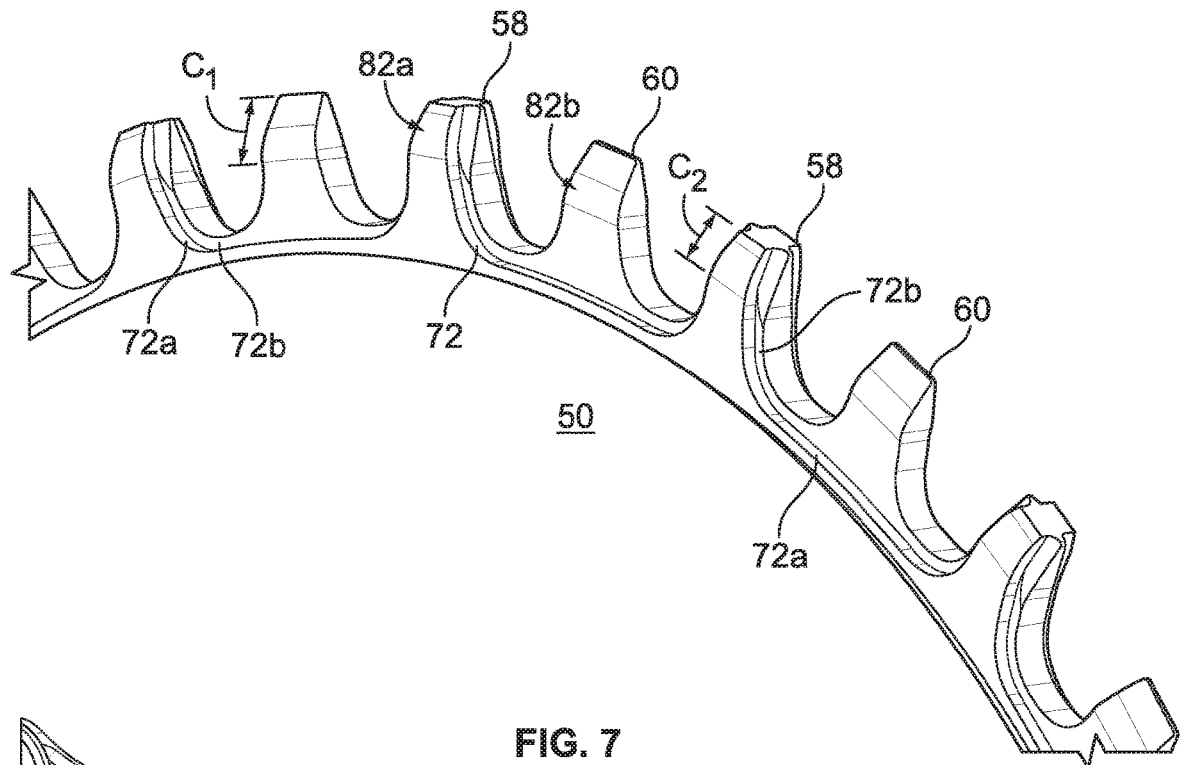
FIG. 7 is an isometric front view of the chainring of FIG. 6.
Figure 8:
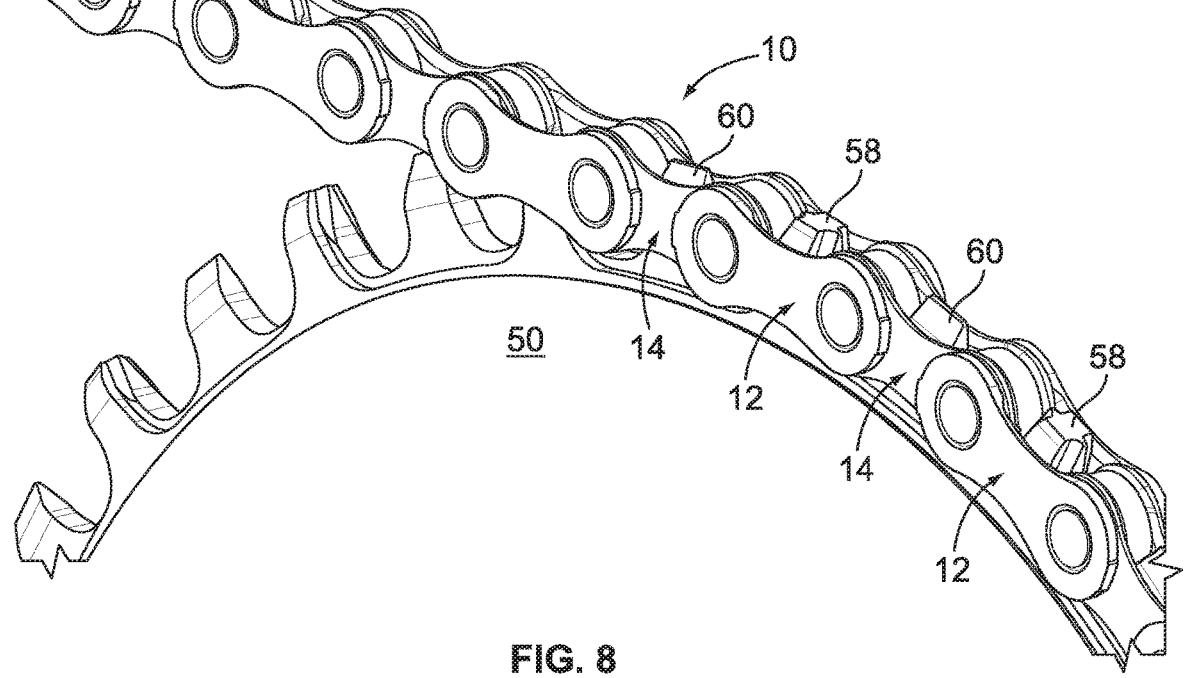
FIG. 8 is an isometric front view of the chainring according to FIG. 7, in engagement with a drive chain.
Figure 9:
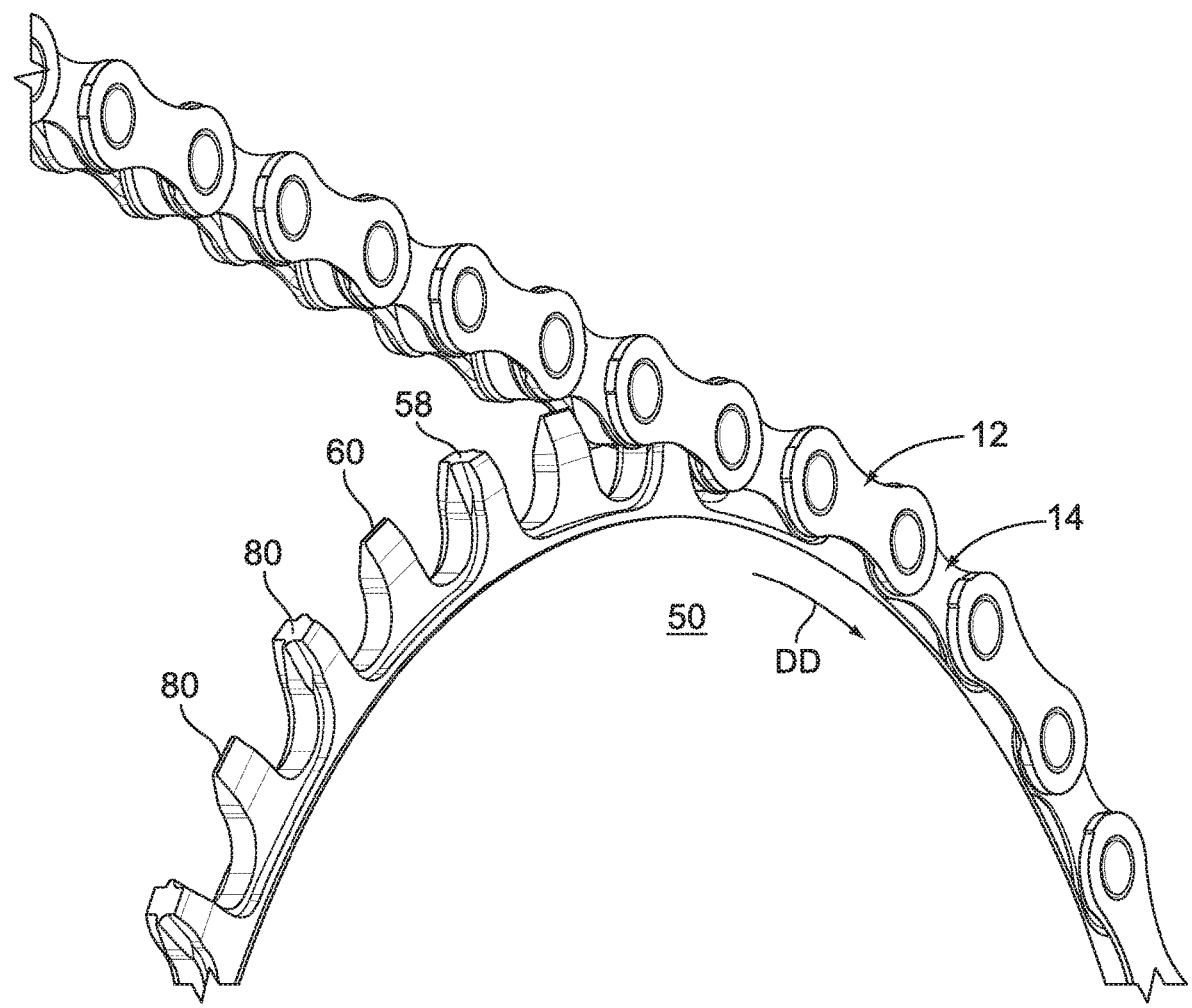
FIG. 9 is an isometric rear view of the chainring according to FIG. 7, in engagement with a drive chain.

Turning now to FIG. 7, the teeth of the first group of teeth 58 and the teeth of the second group of teeth 60 of the chainring 50 are arranged in an alternating manner. An optional feature of the teeth of each of the first group of teeth 58 and of the second group of teeth 60 is a corresponding outer chamfer 82a, 82b. Each tooth of the first group of teeth 58 has an outer chamfer 82a which may be an arcuate surface on the outer face 54 or a shoulder of each tooth. Each tooth of the second group of teeth 60 has an outer chamfer 82b, which may be an arcuate surface on the outer face 54 or shoulder of each tooth. The outer chamfer 82b of each tooth 60 may have an extent $C_1$ which is greater relative to the extent $C_2$ of the outer chamfer 82a of each tooth 58. In FIGS. 8 and 9 the chainring 50 comprises a chain 10 positioned and engaged thereon. Outer chain link elements 12 are positioned on the first group of teeth 58. Inner chain link elements 14 are positioned on the second group of teeth 60.

Figure 10:
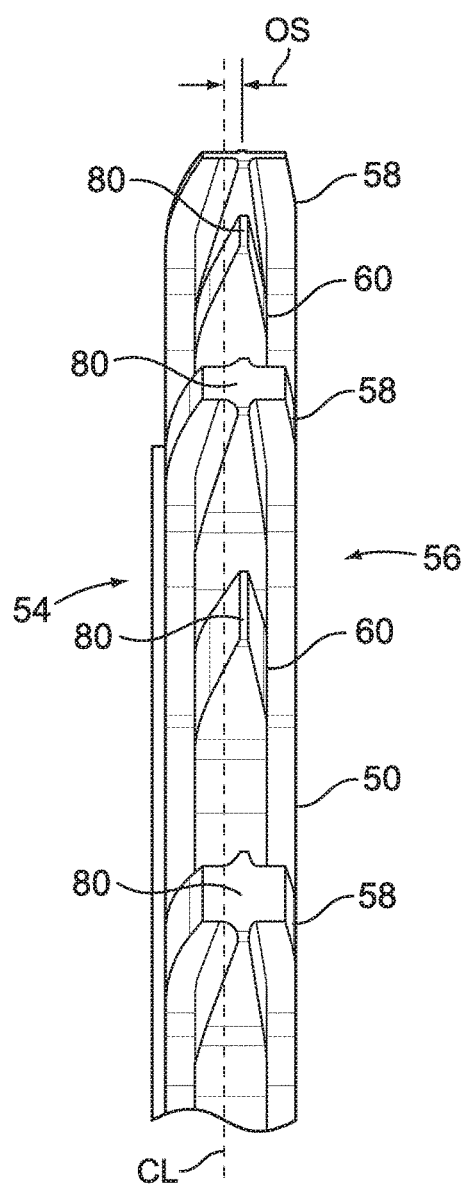
FIG. 10 is a front view of the chainring of FIG. 9.
Figure 11:
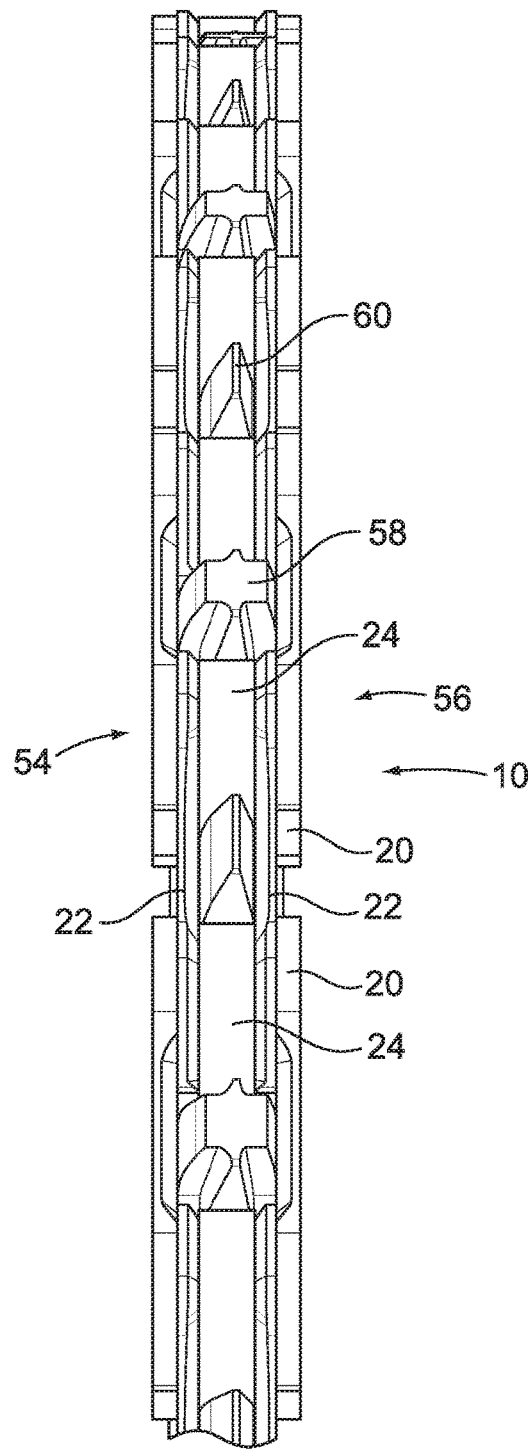
FIG. 11 is a front view of the chainring of FIG. 10 in engagement with a drive chain.

FIGS. 10 and 11 accordingly show a front view of the chainring 50 without a chain 10 and with a chain. An optional feature of all of the teeth 58, 60 of the chainring 50 is an offset OS of the centre point of the tooth tip or upper face 80 from the centre line CL in the direction of the inner face 56 of the chainring. This offset feature provides better guiding of the chain on one side of the chainring.

Figure 16:
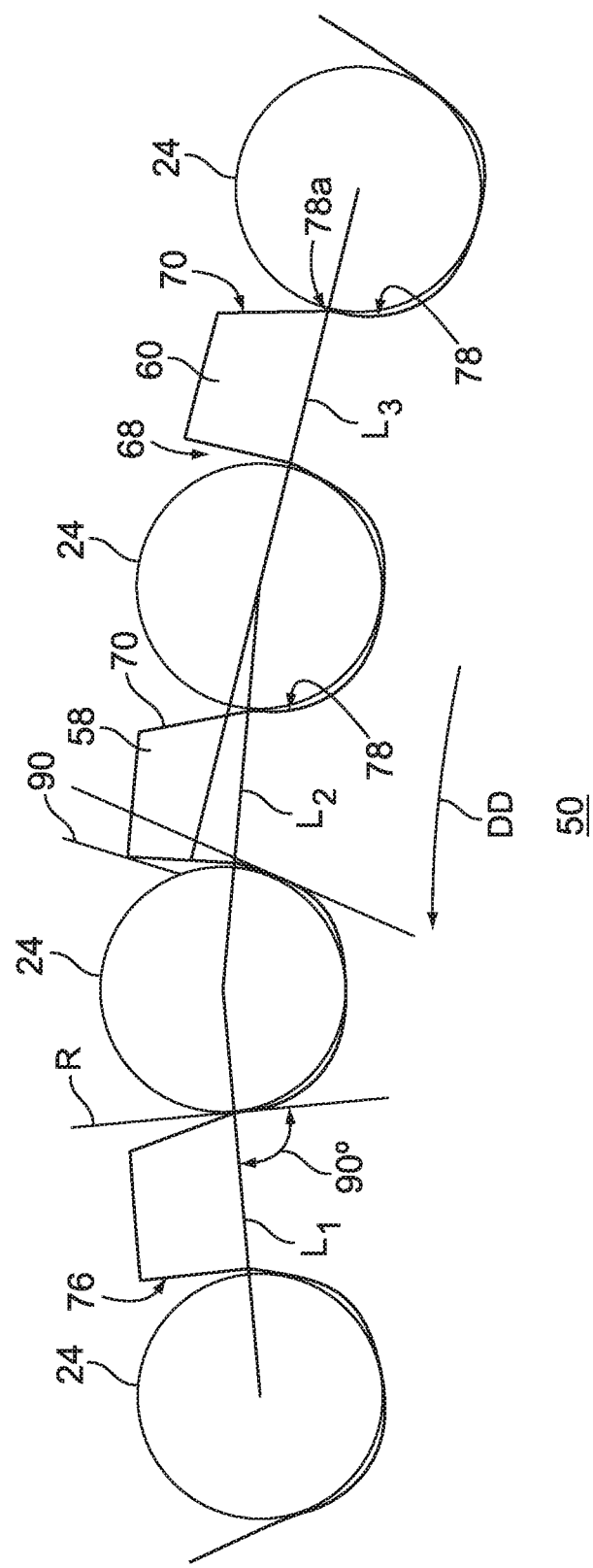
FIG. 16 is a partial side view of the chainring for explanation of the invention with the rollers of a chain in engagement with the teeth of the chainring.

According to FIG. 16, a chainring 50 comprises a number of teeth 58, 60. A link element 1 of a chain engaged with the chainring 50 is represented by the line $L_1$, and the link element 2 and the link element 3 are correspondingly represented by the lines $L_2$, $L_3$. The line of each of $L_{1-3}$ is drawn between the centre points of the axes of each chain roller 24.

The hook feature 78 is shown on the rear flank 70 of each tooth 58, 60. The hook feature 78 is positioned along the rear flank 70 and can co-operate with the tip section 76 of the front flank 68 for better guiding of the chain. The hook feature 78 may comprise a portion of the rear flank 70, which coincides with the radial direction R. The hook feature 78 has a radially outermost extent 78a where the hook feature and the link centre lines $L_{1-3}$ intersect. Alternatively the outermost extent 78a may be higher than the centre lines $L_{1-3}$, so that more space is provided for the engagement of the rollers in the teeth in the driving direction. The curved line 90 is the path of the rollers 24 when they disengage from the tooth.

In operation, the chain 10 is positioned with each of the outer chain link elements 12 on one of the first groups of teeth 58 and with each of the inner chain link elements 14 on one of the second groups of teeth 60. If the chainring 50 is rotated by means of the crank 48, the chain 10 is drawn around the chainring, and the outer chain link elements 12 and the inner chain link elements 14 are brought into engagement sequentially with the corresponding first and second groups of teeth 58, 60. As described in detail above, various features of the chainring 50 serve to guide and hold the chain 10 on the chainring.

Figure 17:
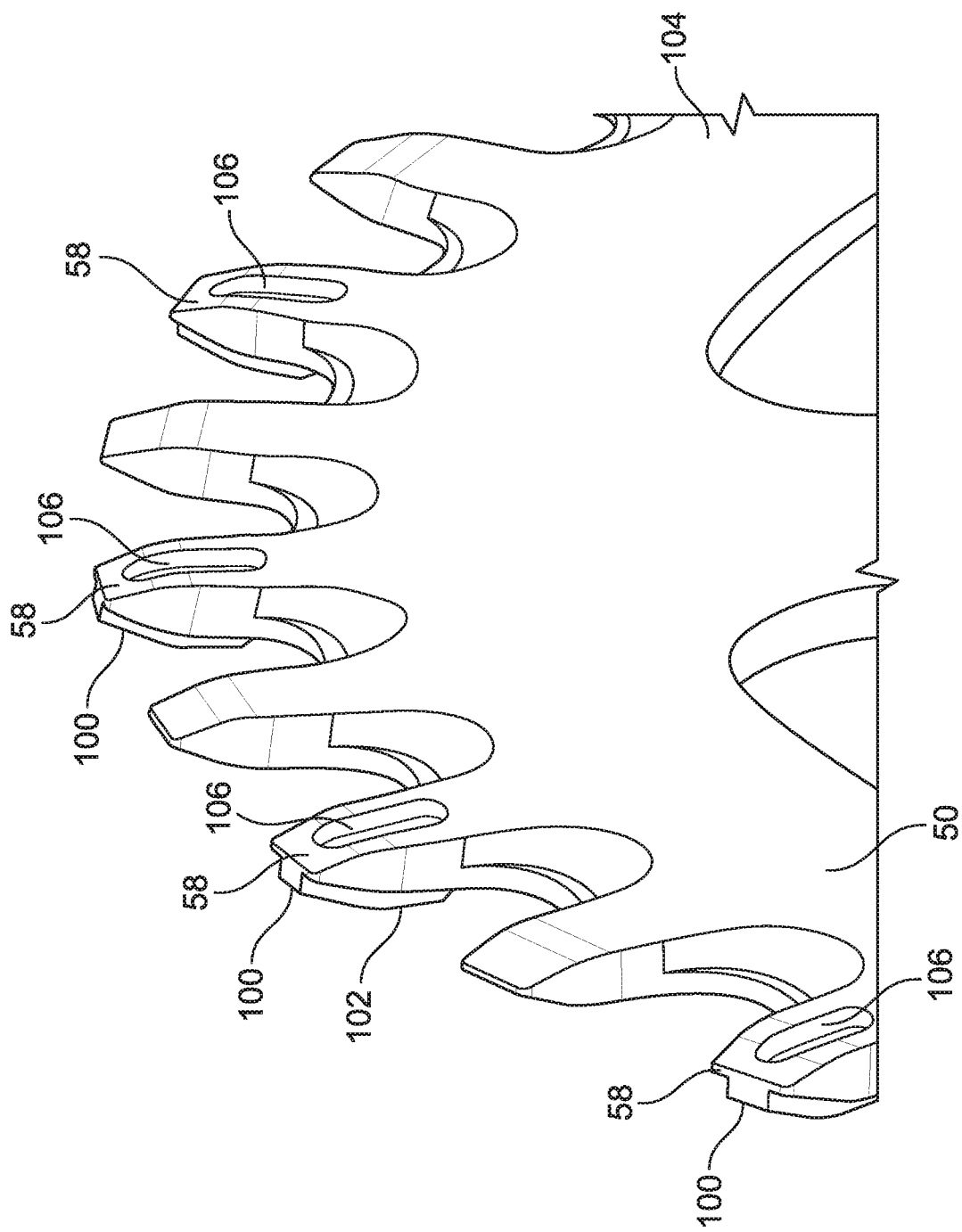
FIG. 17 is a perspective view of a first embodiment of a chainring according to the invention.
Figure 18:
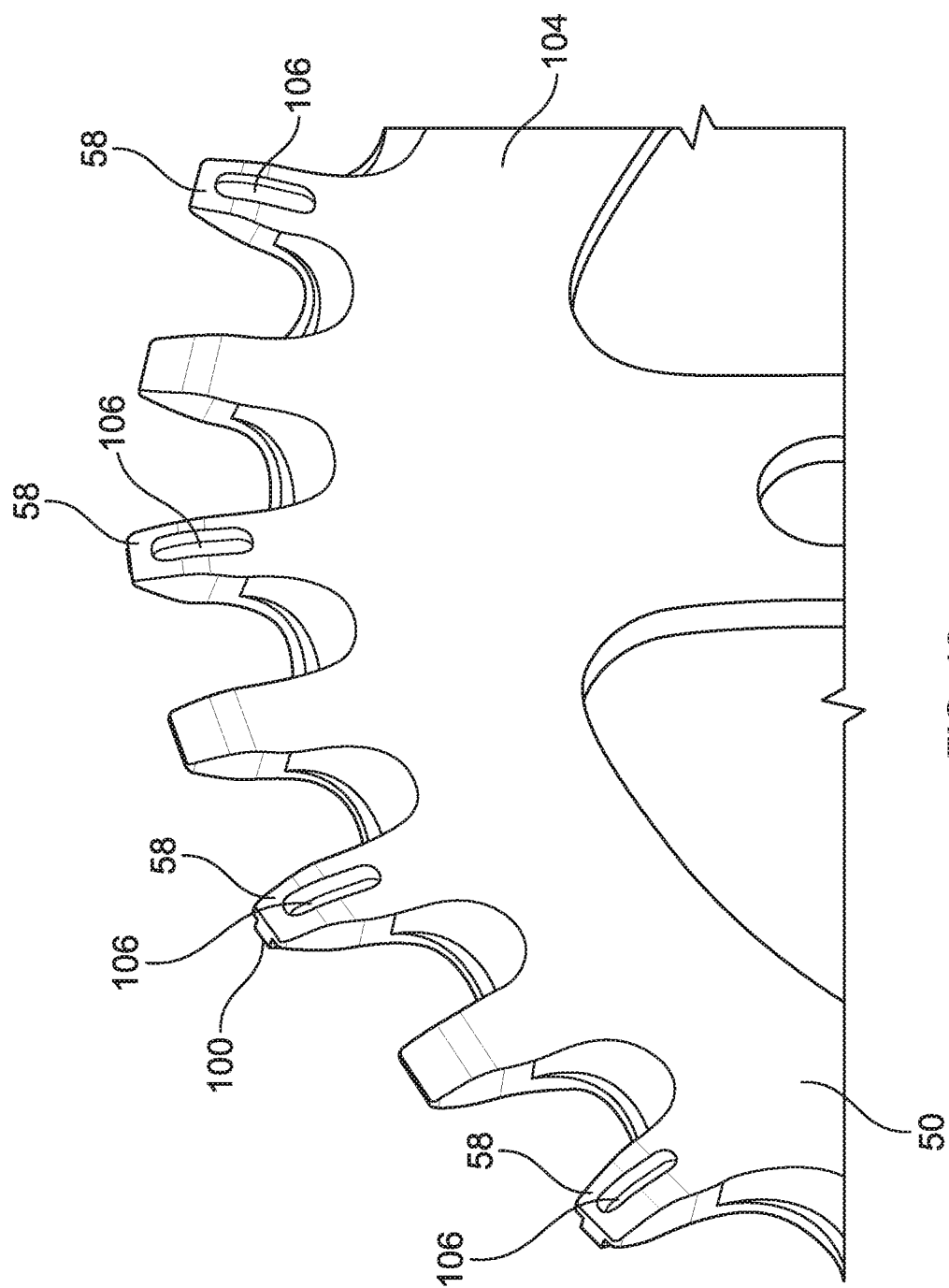
FIG. 18 is a perspective view of the first embodiment of the chainring according to the invention.
Figure 19:
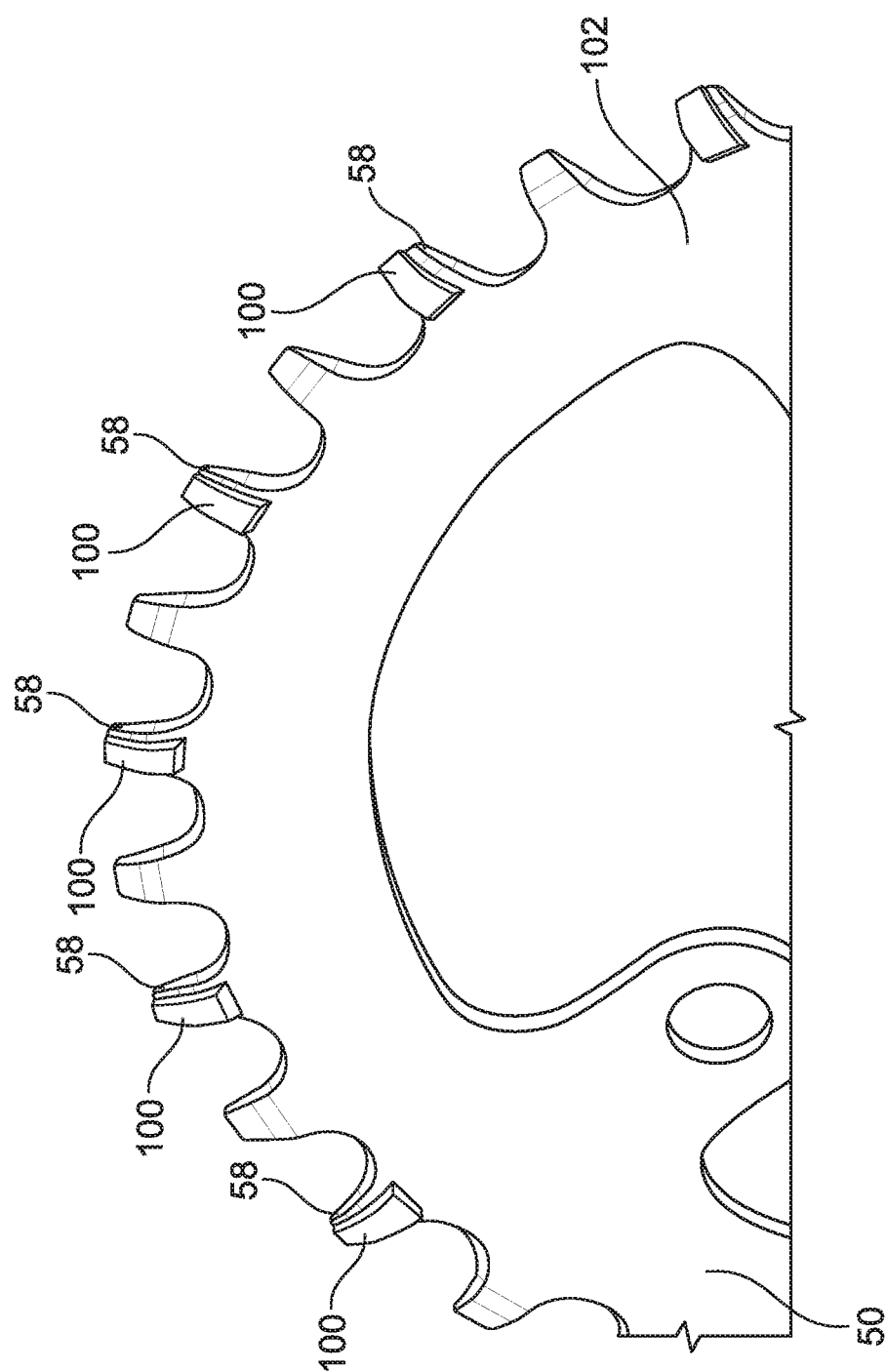
FIG. 19 is a further perspective view of the first embodiment of the chainring according to the invention.

If we now turn to the embodiments of the invention, for which the general explanations above apply for the most part, and if we consider in particular the first embodiment, as shown in FIGS. 17-19, then we recognise that protrusions 100 on the teeth 58 of the first group of teeth are provided on the outer face 102. These protrusions 100 are achieved in that elongated impressions 106 are made on the inner face 104 of the chainring 50. As these impressions 106 are produced, the material of the teeth 58 of the first group of teeth is brought into a flowable state and the protrusions 100 are formed by a suitable mould. These extend, as can be seen in FIG. 19, substantially over the entire radial length of the individual teeth 58. The size of the protrusions 100 is determined by the size of the impressions 106 and naturally by the shaping on the outer face of the teeth 58.

The protrusion 100 on the teeth 58 of the first group of teeth guides a chain placed thereon against the chain dropping from the teeth and thus improves the chain guiding characteristics.

Figure 20:
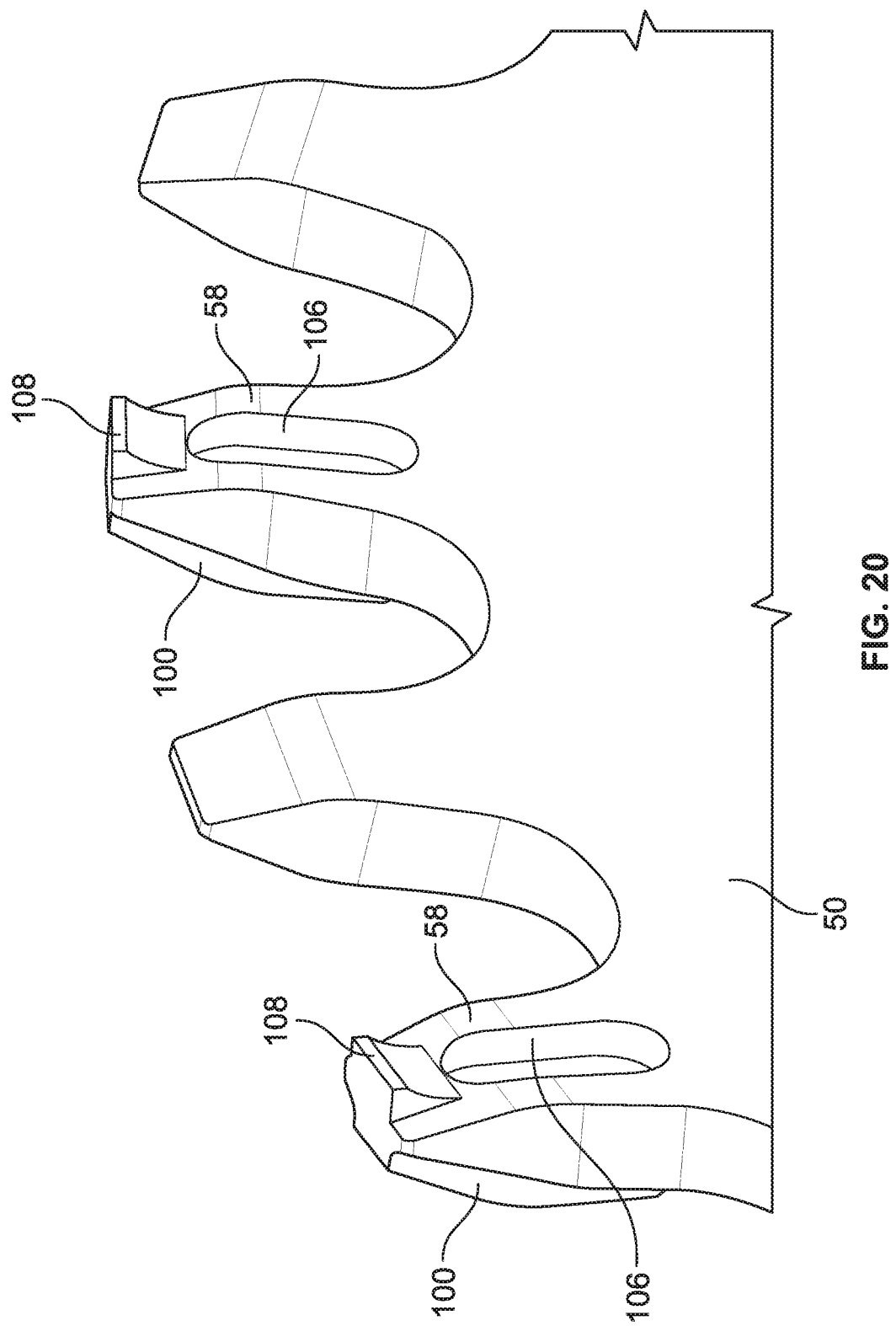
FIG. 20 is a perspective view of a second embodiment of the chainring according to the invention.
Figure 21:
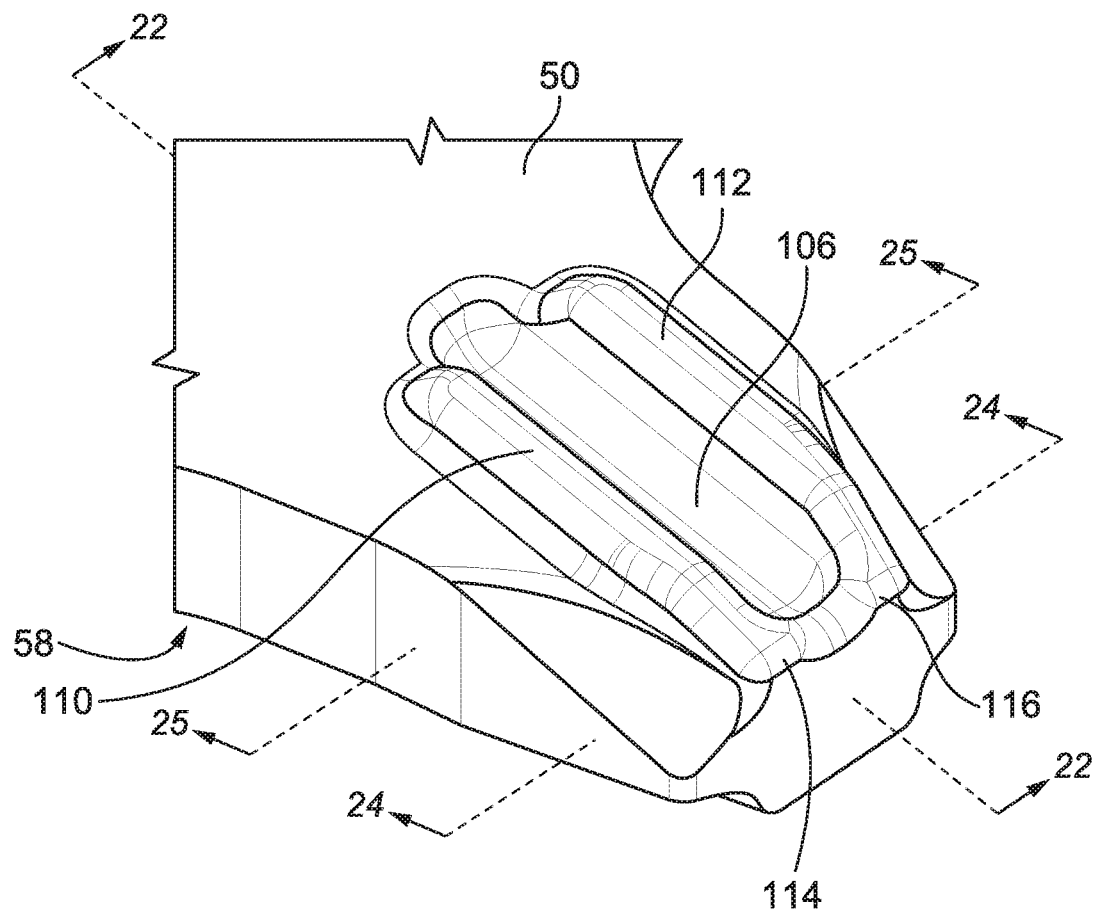
FIG. 21 is a perspective view of a tooth of a third embodiment of the chainring according to the invention.
Figure 22:
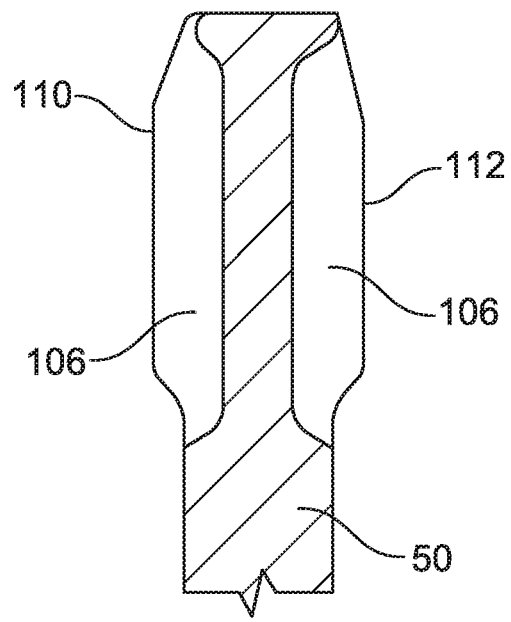
FIG. 22 is a sectional view through the tooth according to FIG. 21 along the section line I-I.

FIG. 20 shows a further embodiment of the invention in which the chainring 50 corresponds substantially to the chainring 50 of the embodiment according to FIGS. 17-19. Additionally, however, a further protrusion 108 is provided above (radially outward of) the impression 106 on the inner face of the teeth 58. This is also produced by material transformation. Also, for this further protrusion 108 on the inner face of the teeth 58 of the first group of teeth, material can be used which is flow-formed by the impression 106.

This further protrusion 108 is configured as a reinforced edge and prevents the faulty laying of the chain, because the inner plates of the chain no longer fit onto the teeth of the first group of teeth which have thus been widened in the region of tooth head.

FIGS. 21 to 25 show a further embodiment of the invention, which concentrates on the representation of various views and sectional views of a tooth 58 of the first group of teeth. This specially configured tooth 58 for example represents teeth of the first group of teeth which are provided on a chainring 50 of the type described above. Also these teeth 58 have impressions 106. However, it may be established that these teeth 58 have corresponding impressions 106 on both sides, i.e. on the inner face and on the outer face. This can be seen in the plan view according to FIG. 23 and the sectional views according to FIGS. 22, 24 and 25. The impressions 106 are of elongated construction. Material is displaced by such an impression 106 during the shaping process. This flows and deforms to produce protrusions 110, 112. The protrusions 110, 112 extend in each case longitudinally along the impression 106 and surround it with curved portions 114, 116 in a top region of the tooth 58.

Figure 25:
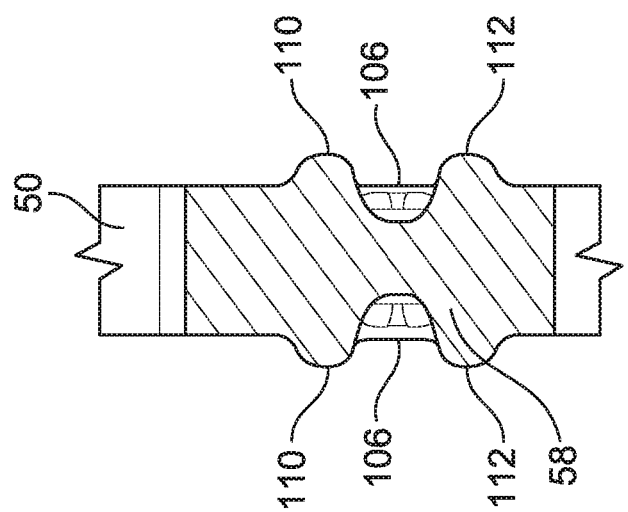
FIG. 25 is a sectional view through the tooth according to FIG. 21 along the section line III-III.
Figure 24:
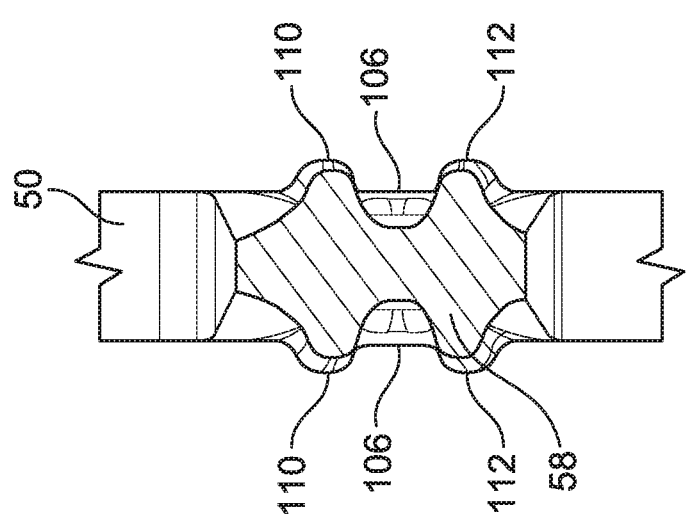
FIG. 24 is a sectional view through the tooth according to FIG. 21 along the section line II-II.
Figure 23:
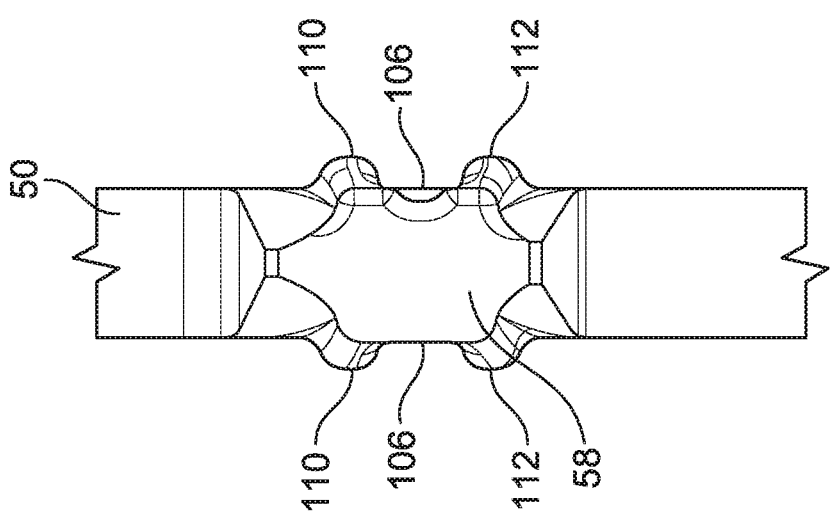
FIG. 23 is a plan view of the tooth according to FIG. 21.

FIGS. 23 to 25 show that the impressions 106 are partially surrounded by the protrusions 110, 112. They also show how deep the impressions 106 penetrate into the tooth 58 and the dimension by which the protrusions 110, 112 project.

In the region of the greatest height of the protrusions, independently of the special embodiments set out in detail above, the tooth may in principle take up more than 20% up to 50% of its actual thickness without deformation. In the region of the deepest point of the impression 106 the tooth can be reduced to up to 30% of its original thickness.

Furthermore, it can be seen in FIG. 23 that the arrangement on both sides of the tooth 58, that is to say on the inner face and outer face, does not have to be configured symmetrically, but that the impressions 106 may have different lengths or arrangements.

Figure 26:
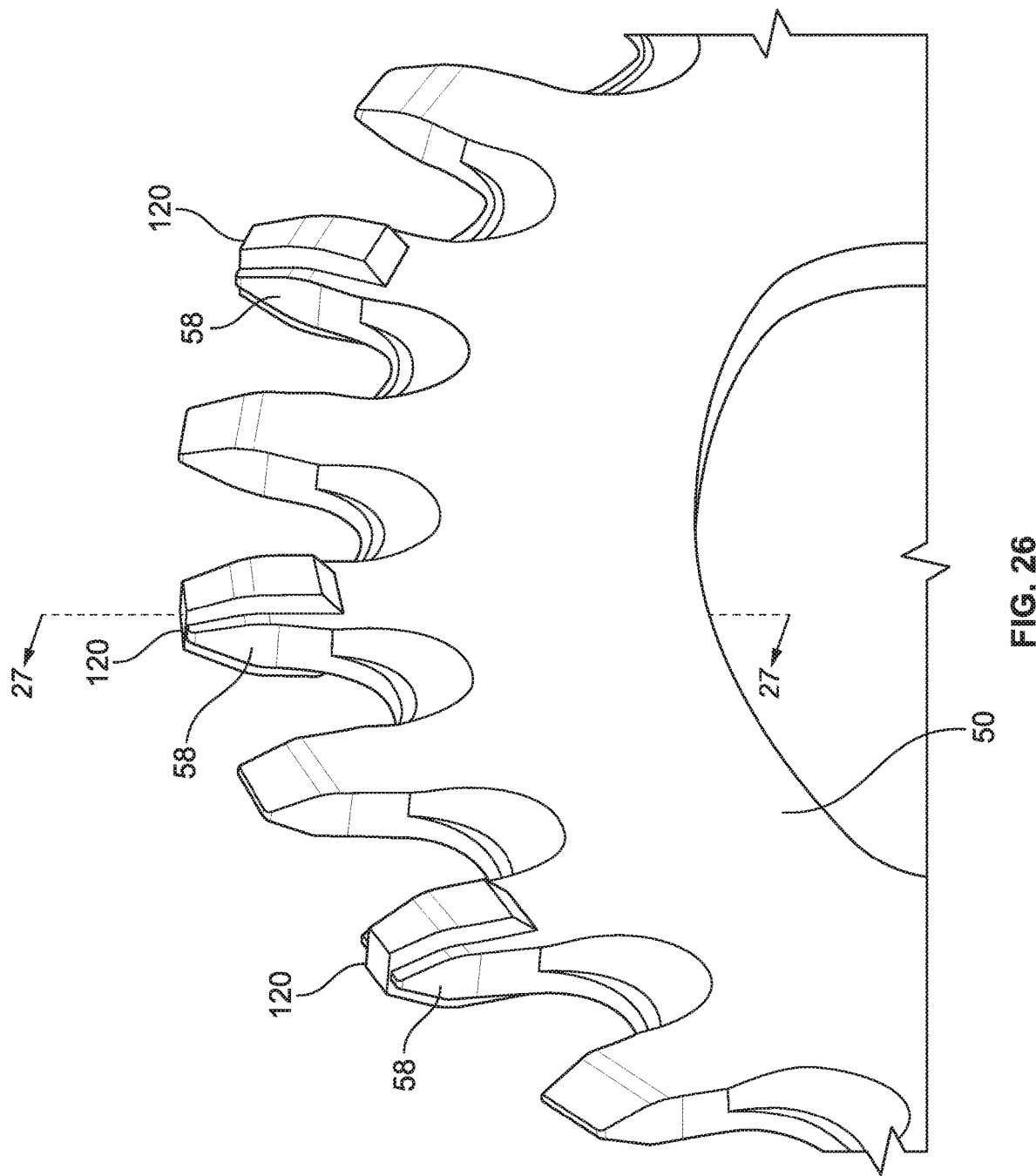
FIG. 26 is a perspective view of a tooth of a fourth embodiment of the chainring according to the invention.
Figure 27:
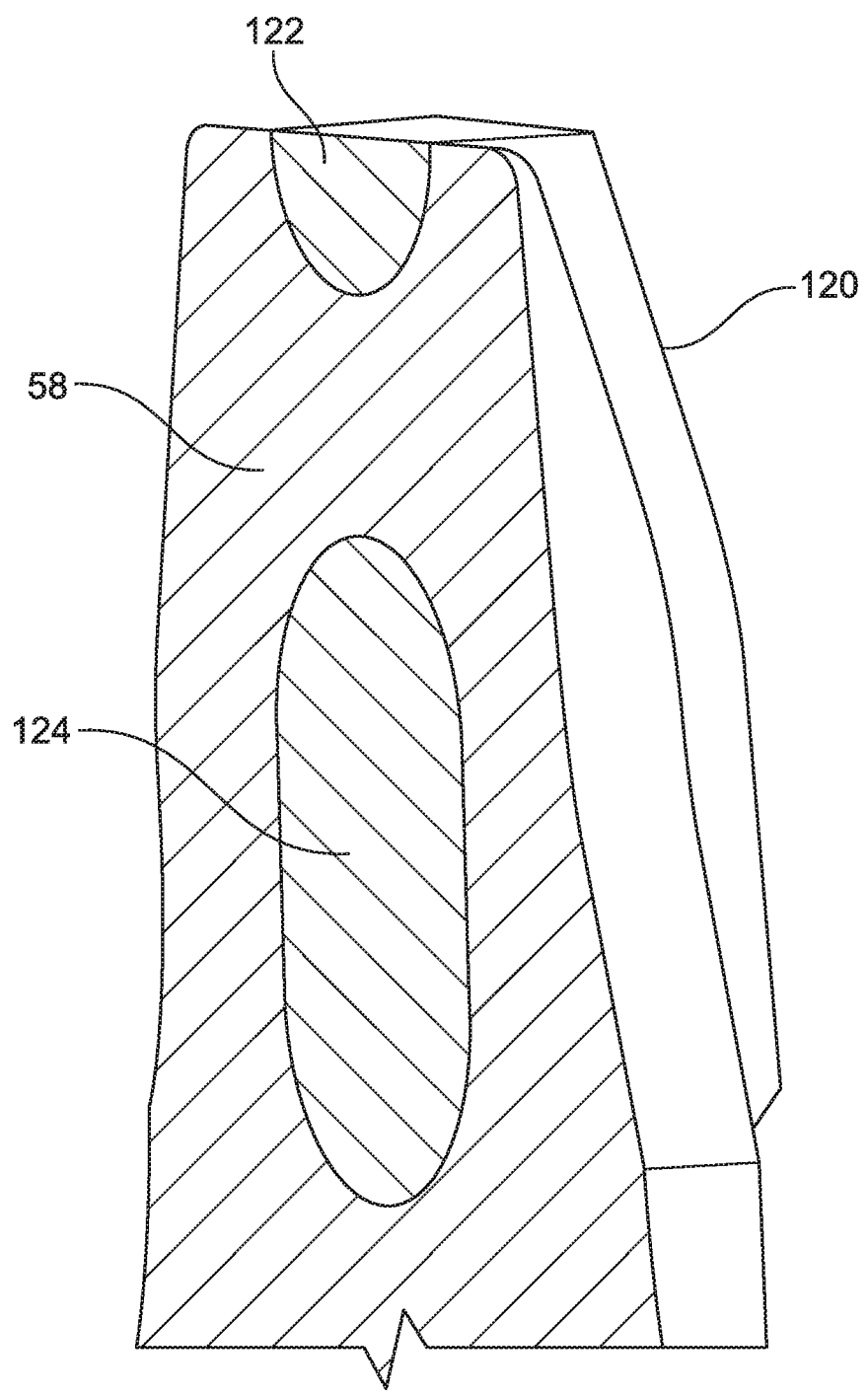
FIG. 27 is a perspective cross-sectional view through a tooth along the section line IV of FIG. 26.

FIGS. 26 and 27 show a further embodiment of the invention. Unlike embodiments described above, the teeth 58 of the first group of teeth of the chainring 50 are provided on the outer face and on their inner face with a coating 120 of applied glass fibre-reinforced plastic material. In this way, the required protrusions are achieved on both sides of the teeth 58 on their outer face and inner face. As can be seen in the sectional view according to FIG. 27, the teeth 58 of the first group of teeth have a recess 122 in their radially outer region and a recess 124 in their central region. These recesses make it possible that the plastic material of the coating 120 not only surrounds the outer and inner face of the teeth 58, but also extends through the teeth 58 through the recesses 122 and 124. In this way it can be ensured that the glass fibre-reinforced plastic material of the coating 120 remains securely, permanently and reliably on the teeth 58.

The application of additional material, such as in the example glass fibre-reinforced plastic material of the coating 120, makes it possible to produce protrusions of the required shape with low technical requirements for manufacture and at low costs. In this way the chain guiding characteristics of the chainring 50 can be advantageously influenced. Alternatively metal material can also be applied by build-up welding or soldering material can be applied by build-up brazing. The basic body can be an easily aligned, flat hardened chainring which is made of steel, has high wear resistance and can be produced cost-effectively.

Whilst the invention has been described with regard to the associated embodiments, it can be seen that various amendments can be undertaken within the scope of protection of the inventive concept. Accordingly the invention is not limited by the disclosed embodiments, but has the entire scope of protection of the following claims.

The invention claimed is:

1. A solitary chainring for a bicycle front crank for engaging a drive chain, comprising:
   a plurality of teeth disposed on a circumference of the chainring, wherein the plurality of teeth has an even number of teeth; wherein the plurality of teeth comprises a first group of teeth and a second group of teeth disposed alternatingly between the first group of teeth,
   wherein each tooth of the first and second groups of teeth has an inner face and an outer face which is opposite the outer face, wherein each tooth of the first group of teeth has at least one first protrusion on one of the inner face and the outer face and each tooth of the second group of teeth is formed without first protrusions on the inner face and the outer face,
   wherein the first protrusion is formed by an application of material on one of the inner face and the outer face of the teeth of the first group of teeth,
   wherein the tooth includes one or both of at least one tooth recess and at least one opening into which the applied material extends in a region of the at least one protrusion.

2. A chainring according to claim 1, further comprising a second protrusion on the other of the inner face and the outer face of each tooth of the first group of teeth.

3. A chainring according to claim 2, wherein the second protrusion is formed by an application of material on the other of the inner face and the outer face of the teeth of the first group of teeth.

4. A chainring according claim 3, wherein the application of material includes one or more of a metal, a plastic material, a synthetic resin material, a fibre-reinforced plastic material and a fibre-reinforced synthetic resin material.

5. A chainring according to claim 2, wherein the first protrusion has a first width and the second protrusion has a second width, and the first width is the same as or greater than the second width.

6. A chainring according to claim 1, wherein the application of material includes one or more of a metal, a plastic material, a synthetic resin material, a fibre-reinforced plastic material and a fibre-reinforced synthetic resin material.

7. A chainring according to claim 1, wherein each outer face and each inner face of every second group of teeth defines a link-receiving recess formed in the chainring along each second group of teeth.

8. A chainring according to claim 7, wherein each link-receiving recess extends from a front flank of a first tooth of the first group of teeth to a rear flank of a second tooth of the first group of teeth, wherein the first tooth and the second tooth of the first group of teeth are adjacent in the driving direction.

9. A chainring according to claim 7, wherein the first protrusion is disposed on the outer face and further comprising a second protrusion disposed on the inner face of each first group of teeth, wherein the first and the second protrusions are defined at least in part by the link-receiving recess.

10. A chainring according to claim 1, wherein each tooth of the first group of teeth and of the second group of teeth comprises a front flank, and wherein the front flank comprises a projecting tip section which is configured to guide the chain.

11. A chainring according to claim 1, wherein the first group of teeth and the second group of teeth are equal in number.

12. A chainring according to claim 1, wherein each tooth of the first group of teeth has a radially outer chamfer which has a first extent along the outer face of each tooth.

13. A chainring according to claim 12, wherein each tooth of the second group of teeth has a radially outer chamfer which has a second extent along the outer face of each tooth, wherein preferably the first extent is smaller than the second extent.

14. A chainring for a bicycle front crank, comprising:
a plurality of teeth disposed on a circumference of the chainring, the plurality of teeth comprising a first group of teeth and a second group of teeth disposed alternatingly between the first group of teeth, the plurality of teeth configured for engagement with a drive chain having alternating outer and inner chain links defining outer and inner link spaces, respectively, each of the first group of teeth sized and shaped to fit within one of the outer link spaces and each of the second group of teeth is sized and shaped to fit within one of the inner link spaces;
wherein each tooth of the first and second groups of teeth has an inner face and an outer face which is opposite the outer face, and each tooth of the first group of teeth has at least one first protrusion on one of the inner face and the outer face and each tooth of the second group of teeth is formed without first protrusions on the inner face and the outer face, and
wherein the first protrusion is formed by an application of material on one of the inner face and the outer face of the teeth of the first group of teeth;
wherein the tooth includes one or both of at least one tooth recess and at least one opening into which the applied material extends in a region of the at least one protrusion.

* * * * *